United States Patent [19]

Sampsell et al.

[11] Patent Number: 5,654,741
[45] Date of Patent: Aug. 5, 1997

[54] SPATIAL LIGHT MODULATOR DISPLAY POINTING DEVICE

[75] Inventors: Jeffrey B. Sampsell, Plano, Tex.; Toshio Shionoya, Kanagawa, Japan

[73] Assignees: Texas Instruments Incorporation, Dallas, Tex.; Sony Corporation, Tokyo, Japan

[21] Appl. No.: 567,439

[22] Filed: Dec. 5, 1995

Related U.S. Application Data

[63] Continuation of Ser. No. 245,093, May 17, 1994, abandoned

[51] Int. Cl.$^6$ ........................................... G09G 5/08
[52] U.S. Cl. ........................................... 345/158; 345/157
[58] Field of Search ........................................... 345/145, 156, 345/157, 158, 163, 165, 166; 178/18

[56] References Cited

U.S. PATENT DOCUMENTS

| | | | |
|---|---|---|---|
| 4,280,135 | 7/1981 | Schlossberg | 178/18 |
| 4,832,447 | 5/1989 | Javidi | 364/822 |
| 5,181,015 | 1/1993 | Marshall et al. | 345/158 |

OTHER PUBLICATIONS

Proxima product announcement, no date given.

*Primary Examiner*—Richard Hjerpe
*Assistant Examiner*—Kent Chang
*Attorney, Agent, or Firm*—Julie L. Reed; James C. Kesterson; Richard L. Donaldson

[57] ABSTRACT

A display system with a pointer that is not restricted by wires or sensors. The display uses a spatial light modulator (14) for projecting an image on the screen (20). During a time period when all of the cells of the modulator (14) are in the same state, a cursor projected onto the screen by the pointer is reimaged from the screen to a detector (26), which translates the cursor image into signals for a central processing unit (38). The central processing unit (38) then directs the system as to what tasks are being dictated by the cursor.

7 Claims, 2 Drawing Sheets

SPATIAL LIGHT MODULATOR DISPLAY POINTING DEVICE

This application is a continuation of application Ser. No. 08/245,093 filed on May 17, 1994, now abandoned.

1. FIELD OF THE INVENTION

This invention relates to spatial light modulator displays, more particularly displays that use a pointing device.

2. BACKGROUND OF THE INVENTION

Pointing devices such as "mice" allow users to move quickly from one task to another, or between documents with great ease. However, the use of such a device must be within certain limits. The most common use occurs with a personal computer by a single user. The mouse has a wire that connects it with a central processing unit, which relays the position of the cursor to the unit for inputs and tracking. The screen has an arrow or some other kind of cursor for the user's convenience to see the position of the cursor. The computer does not use this arrow or cursor, relying instead on the wired-in inputs.

In larger displays, such as meeting room displays, pointing devices function in much the same way as the smaller versions. Instead of the screen having a limited size, the computer display projects onto a screen where several people can view it. Pointing devices send their inputs to the CPU in much the same way through a wire. The cursor on the screen again only serves the user's convenience.

The CPU tracks the cursor position in this large wired-in mouse by time or triangulation. In the time tracked systems, the CPU monitors where in the raster scan of a CRT an input occurs, then processes that information for the appropriate screen and task response. Triangulation occurs in the unwired systems. Previous to the mouse's use, two sensors have been placed in the room, which constantly triangulate the position of the device and it's relative coordinates on the screen, and then communicate these to the CPU.

A problem occurs in these pointing devices when the system no longer has a rasterized display. Spatial light modulators such as liquid crystal displays (LCD) and digital micromirror devices (DMDs, also known as deformable mirror devices) have made great leaps in acceptance as display technologies. Since they do not have a rasterized format, the CPU can no longer track the mouse position in the same way.

For the smaller systems, with one user and a hard-wired mouse, the system functions in the same way, using the sensors on the mouse to send the position of the cursor. Instead of the position being a certain point in a rasterized display, it would now be the position on an x-y grid. Spatial light modulator as well as certain other displays have an x-y grid of individual elements that create the picture. However, in the large displays, the time systems are no longer functional, and the triangulation becomes much more difficult.

A need arises, therefore, for a pointing device that can perform with large, spatial light modulator, or other x-y grid type displays.

SUMMARY

A display system with a pointer is disclosed. The display system uses a spatial light modulator to generate an image onto the screen. A pointer is used to project a cursor image onto the screen. The projection optics reimage the projected cursor image back onto the spatial light modulator and then that image is relayed to a detector. The detector uses the image to create electronic signals that are used to control the system.

It is an object of the invention to provide a pointer for a display that is not restricted by wires, or sensors and can be used from any place in the area of the display.

It is an object of the invention to provide a pointer which can be used with any spatial light modulator system, either reflective or transmissive.

It is an object of the invention to allow any viewer to utilize the pointer without regard to position in the room or proximity to the system generating the display.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

In most pointing devices the cursor on the screen serves the user only and provides no assistance to the CPU. The CPU tracks the device from a wire, whether that wire is mounted on the device, or on a sensor that communicates with the device, as in sensor or infrared mice. Because of the unique nature of x-y grid arrays such as spatial light modulators, the CPU can utilize that cursor, arrow or dot on the screen to determine the mouse's location.

Spatial light modulator displays, or other x-y grid arrays, cannot use the timing method that locates the input from the device at the time in the raster the input was received. One method of determining where the pointing device is directed is to reimage the screen back onto the x-y grid and use a detector to locate the reimaged cursor. This discussion will center around reflective spatial light modulators and then adapt the principles laid out for transmissive modulators.

Figure 1:
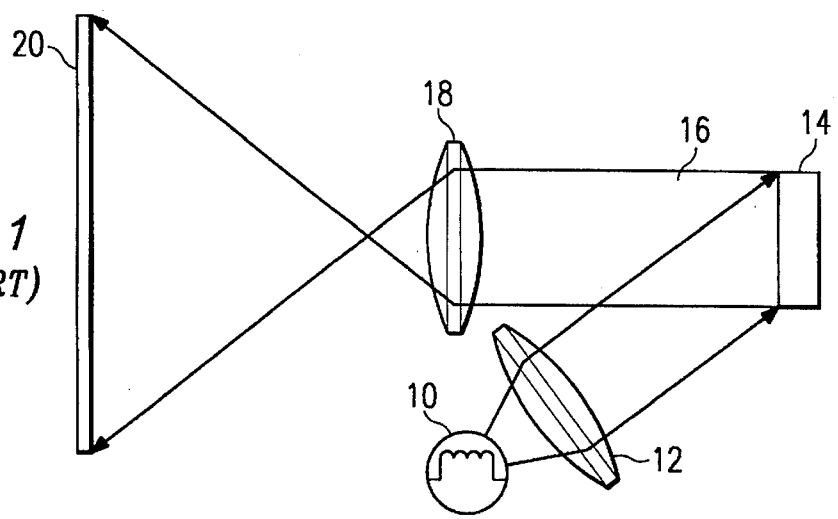
FIG. 1 shows a block-diagram of a typical spatial light modulator display with optics.
Figure 4A:
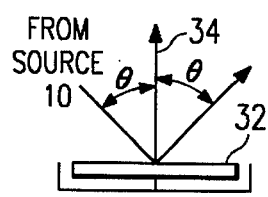
FIGS. 4a–4d show side schematic views of a reflective spatial light modulator element with various light inputs and outputs.

An optical block diagram for a typical reflective spatial light modulator display is shown in FIG. 1. Light source 10 generates light which is transmitted via lens 12 to the x-y grid 14. The angles of reflection are discussed in further detail in FIGS. 4a–4c, but when the elements of the array are ON, they reflect the light down path 16 to the imaging lens 18. Imaging lens 18 then transmits the light, formed into an image at x-y grid 14, onto the screen 20.

Assuming a modulator that has two reflective angles operating in a bidirectional manner, there are three paths of light from the light source. The first is the one shown in FIG. 1, the ON light path. The second is the OFF path, when the elements are in the other direction from the ON direction. The final is the "flat" path, where light goes when the modulator elements lie flat, in their unaddressed state. Notice that the modulators could be flat for the ON state and reside in a angled state for OFF. The principles still work, they would just be reversed.

For modulators that only have one reflecting angle, the OFF path is the same as the "flat" or unaddressed path. In this case, operation of the pointing device described herein requires that a method be provided to optically separate the image reflected from the screen from the image beam propagating to the screen. The separated, reflected screen image is then directed to the detector, which, together with associated hardware and software, locates the cursor image within the screen image and communicates that location to the CPU. For modulators operating in a bidirectional fashion, reflecting light into ON and OFF paths separate from the "flat" or unaddressed path, a different optical arrangement is necessary. The reflected screen image is mixed with light reflected in the "flat" direction, and a method of discriminating between the two signals must be provided. After this discrimination, the detector and its associated hardware and software must locate the cursor image within the screen image and communicate that location to the CPU as before.

Figure 2:
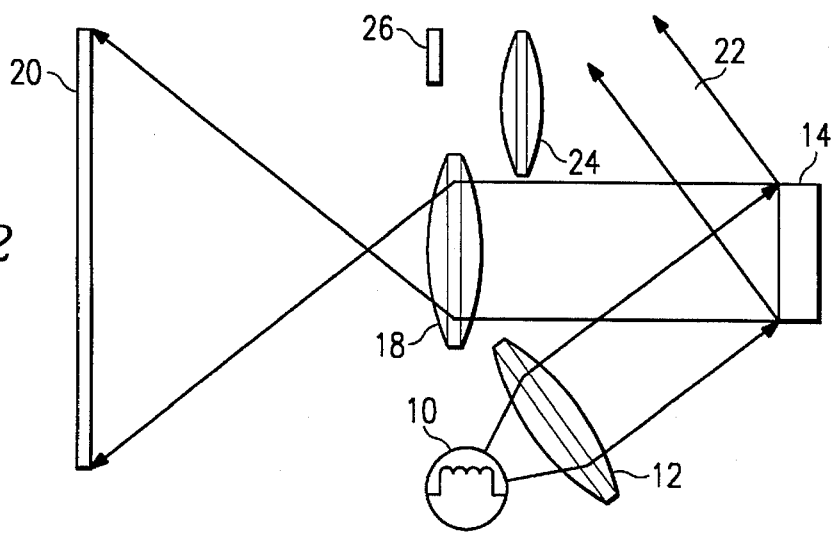
FIG. 2 shows a block-diagram of a spatial light modulator display adapted to include a detector for a pointing device.

In the bidirectional case, the light from the source 10 passes through lens 12 to the modulator array 14. When the elements are OFF, as in FIG. 2, the light does not travel path 16 from FIG. 1, to the lens 18 and ultimately to the screen 20. Instead the light travels path 22. Lens 24 and detector 26 must lie away from the light coming from the OFF modulator elements so as to not produce a false pointing image. As can be seen in FIG. 2, path 22 bypasses the lens 24 and therefore no light impinges detector 26.

Figure 3:
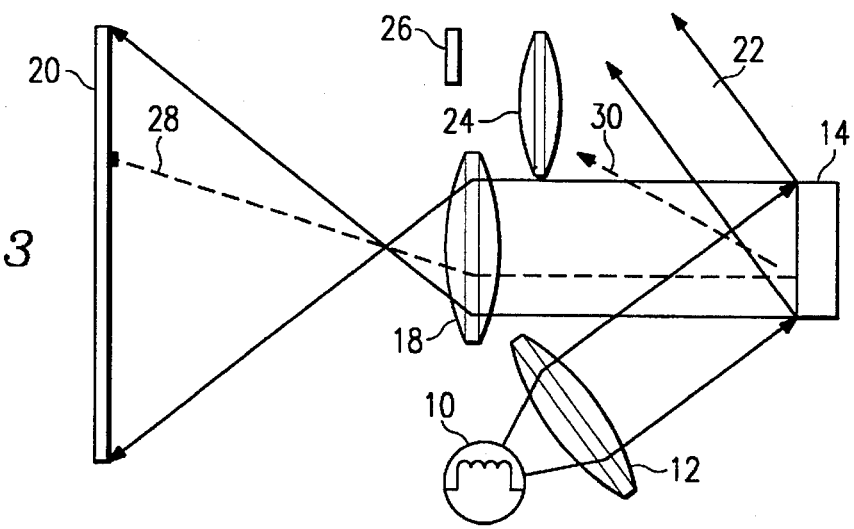
FIG. 3 shows the input from a pointing device being taken from the screen and onto the detector.

In FIG. 3, as in FIG. 2, the modulator cells are OFF. A pointer would generate a dot on the screen 20, the light from which travels through lens 18, along the dashed line to the modulator 14 and then along path 30 through lens 24 and onto the surface of the detector 26. Again, as in FIG. 2, light source 10 generates light that ultimately travels path 22 and misses the lens 24 and detector 26.

Figure 4B:
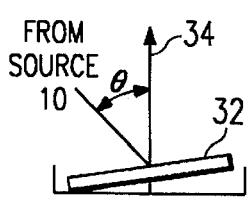

A potential problem with this system occurs in path 30. As mentioned previously, the light from the flat parts of the modulator also travel in path 30. This can be seen in FIG. 4a. When the modulator element 32 is flat, the light enters from the source at an angle from source 10. It then reflects off the face of the modulator at an angle equal to this angle. In FIG. 4b, the modulator is tilted ON, and therefore the light angles down the axis 34, eventually impinging upon screen 20 as shown in FIG. 1.

Figure 4C:
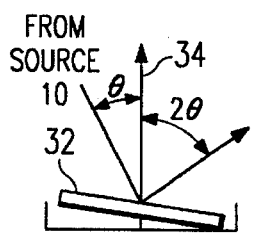
Figure 4D:
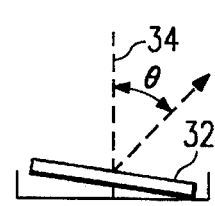

When the modulator is OFF, as in FIG. 4c, the light reflects at a greater angle than when the modulator is merely flat, as was mentioned in FIGS. 2 and 3. However, when the modulator is OFF, as in FIG. 4d, and light is being reimaged from the screen, this light travels the same path as the modulator's "flat" path.

In a perfect reflective modulator, only the active areas of each element of the modulator array would be reflecting light. Unfortunately, some portion of the light incident upon actual reflecting modulators is always directed into the "flat" path. One example of such a phenomenon happens in the digital micromirror device (DMD, also known as the deformable mirror device).

In the DMD, for example, an active area mirror is suspended upon hinges between two posts. The mirror is addressed to one side or the other, causing the mirror to deflect to whichever side has the addressing signal. For example, the DMD would torque to the left if the left side in FIG. 4b had been addressed. Because of it's architecture, the post and part of the hinges that are nearest the post do not twist to reflect the light as in FIGS. 4b or 4c. Therefore, some light will reflect as if the modulator were flat as in FIG. 4a. DMDs can be manufactured to minimize the effect by concealing nonactive reflective surfaces, but diffraction from the mirror array will continue to direct light into the "flat" direction.

This reflected light from the stationary element, "flat" light, travels the same path as the light being reimaged by the screen. Somehow the light from the screen must be separated from the "flat" light. Encoding the light from the screen or using a specific frequency of light will eliminate this problem.

For example, the pointer could have both a visible source of light, for the user to see the pointer, and an invisible source of light, such as ultraviolet (UV) for the signal light. The detector could then have a filter in front of it that only allows UV light transmission. Another alternative is to coat the lens 24 with a coating that absorbs visible light. Either of these alternatives plus the many other ways the light could be separated will help reduce any "noise" light from the modulator 14 that could interfere with the detection.

A second method to facilitate discrimination between the combination of light from the illumination beam and the reflected screen image and the pointing device illumination is to encode the pointing device illumination with a time modulated signal. There are several types of analog and digital modulation is common use that would be appropriate, but most require a detector response time very short relative to the detector response time necessary to merely determine the location of the pointing cursor. Such fast detectors would lead to additional system cost, especially in systems using pixelated detectors to locate cursor position.

There are two fundamental classes of detectors that immediately suggest themselves for this cursor location system. One example of a possible detector would be a pixelated modulator, such as with a charge-coupled device (CCD) array. Hardware and software associated with the CCD must process the received image data to infer a location for the pointer. For a typical 640 pixel by 480 pixel display, the detector would have to receive and process 307,200 pixels and send the location of the pointer to the CPU after it is located. Very few CCD or other pixelated arrays are fast enough to keep up with typical cursor motion and then have speed in reserve to decode a modulated signal. For use with modulated signals a better option might be a quadrant detector, which has the face of the detector divided into four quadrants, when the pointer is just located by the strength of signal falling into each quadrant, rather than by what exact pixel location at which the pointer is active. Such a detector can obviously be used for non-modulated signals as well.

Figure 5:
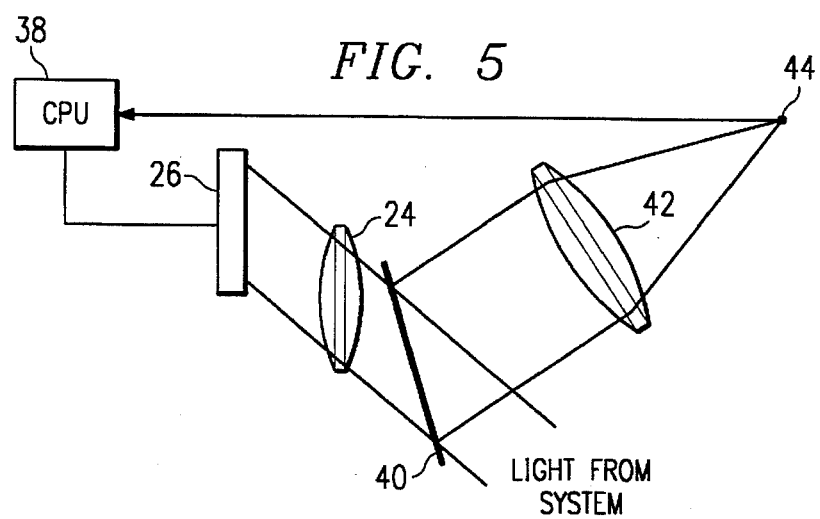
FIG. 5 shows the detection portion of the system with an example of an alternate configuration for detecting a cursor.

Another option is to have the signal light activated only when there is a task to be performed, similar to clicking a mouse on a task space in a personal computer. This could be achieved by adapting the detection part of the system as shown in FIG. 5. The signal light would only be activated when a task must be performed, with a button similar to that on a hard-wired mouse. The pointing light is still usable for presentations, but the signal light is operated separately.

When the signal light is operated, it travels the same path as was shown in FIG. 4. In FIG. 5, a filter 40, such as those discussed previously and below, could separate a portion of the signal light from the other light, that separated light being directed to a smaller number of photodiodes 44 or some other type of fast photodetector through lens 42. In this manner, the CPU 38 could receive a signal indicating that a task is to be performed only when the button is pushed. This would reduce processor load and perhaps eliminate the need for separate pointing device hardware. This process could be used to eliminate the need for visible illumination from the pointing device. When the photodetector receives the signal, it could then insert the image of the pointer into the graphic being projected and thereby eliminate the need for the visible part of the pointer, except that needed to tell the operator where the pointer is. This would require constant position updates and consequently raise process load.

Other specific frequencies of light could be used. Infrared (IR) sensors and detectors occur far more often than the similar components for UV. However, for arrays of minute reflective modulators which cause diffraction in and of themselves, IR light may not be practical. All of these light frequencies can be modulated using the AM, FM or digital pulse modulation techniques discussed above. The modulated light beams could then be separated using a filter passing only the particular modulation before the light from the screen impinges on the detector, thereby separating the desired signal from the noise. An advantage of this technique is that information concerning the manipulation of other cursor controls (of buttons) can be encoded into the modulation data stream.

Figure 6:
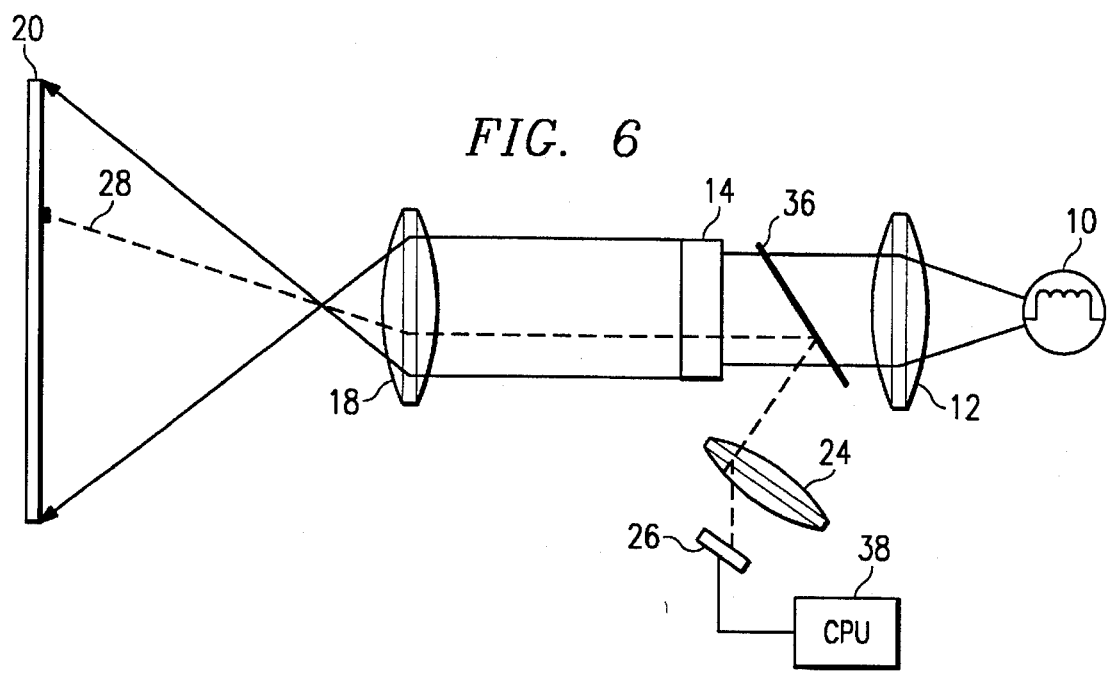
FIG. 6 shows one example of a block diagram for a system using a transmissive light modulator and a pointing device.

For transmissive modulators, similar concepts can be used, especially with transmissive modulators that require polarized coatings, such as liquid crystal displays (LCD). A base system for such a modulator is shown in FIG. 6. Light source 10 now resides on-axis with the screen 20. Light generated from source 10 travels through lens 12 and half-silvered mirror, or some similar component, 36, to modulator 14. The modulator in this case either transmits or blocks the light and sends the resultant image to the screen via lens 18. When a pointer is used, all of the cells are addressed in the transmit mode. Other components instead of half-silvered mirrors could include cold or hot mirrors, or other optical components that reflect at some wavelengths and are transparent in fie visible light realm.

At the screen, the projected dot from the pointer travels path 28 back through the lens 18 and through the all-transmitting modulator 14. The light impinges upon half-silvered mirror 36 which directs the light to lens 24 and detector 26. This type of system limits the amount of noise light. To overcome any problems with polarization as the light travels through the modulator, as may occur with LCDs, the half-silvered mirror could also reside in front of the modulator, as long as it passes light of the polarization that results from the modulator. The half-silvered mirror could instead be a polarizing filter, that allows light of a certain polarization through, after the light has been polarized by the LCD.

Either system, for reflective or transmissive modulators allows the use of a pointer that is reimaged back from the screen onto a detector. The detector then converts the image of the pointer's cursor and sends the information to the CPU as an electronic signal which causes the CPU 38 to perform any tasks dictated by the signal. This system eliminates the need for a wired-in pointer, or an array of sensors that need to be positioned around the room. Such a system facilitates group interaction and ease of movement by having a portable pointer that is unrestricted.

Thus, although there has been described to this point a particular embodiment for a method and structure for a projection display pointer, it is not intended that such specific references be considered as limitations upon the scope of this invention except in-so-far as set forth in the following claims.

What is claimed is:

1. A display system comprising:
    a. a light source;
    b. a digital micromirror device comprising an array of mirrors for receiving said light from said source and projecting an image to said screen by deflecting selected ones of said array of mirrors to form and image on said screen;
    c. a screen for displaying said image;
    d. a pointer for generating a cursor image and projecting said cursor image on said screen, such that said cursor image can be reimaged from said screen to said digital micromirror device;
    e. a detector for receiving said cursor image from said digital micromirror device when said digital micromirror device has been addressed such that all of said array of mirrors are in the OFF position, and for converting said cursor image into an electronic signal; and
    f. a central processing unit for receiving said electronic signal and performing any tasks dictated by said signal.

2. The display system of claim 1 wherein said cursor image is of light in the ultraviolet range.

3. The display system of claim 1 wherein said cursor image is of light in the infrared range.

4. The display system of claim 1 wherein said cursor image is of light in the visible range pulsed at a certain rate.

5. The detector of claim 1 wherein said detector includes a filter operable to filter one of AM, FM and pulse modulated frequencies.

6. The detector of claim 1 wherein said detector comprises at least one photodiode.

7. The detector of claim 1 wherein said detector comprises a CCD array.

* * * * *